| United States Patent [19] | [11] | Patent Number: | 4,900,362 |
|---|---|---|---|
| Fujiki et al. | [45] | Date of Patent: | Feb. 13, 1990 |

[54] PRIMER COMPOSITION

[75] Inventors: Hironao Fujiki, Takasaki; Takehide Okami; Yuji Hinoto, both of Annaka, all of Japan

[73] Assignee: Shin-Etsu Chemical Co., Ltd., Tokyo, Japan

[21] Appl. No.: 323,025

[22] Filed: Mar. 15, 1989

[30] Foreign Application Priority Data

Mar. 16, 1988 [JP] Japan .................................. 63-62760

[51] Int. Cl.$^4$ ................................................ C09K 3/00
[52] U.S. Cl. ............................ 106/287.14; 106/287.19
[58] Field of Search ..................... 106/287.19; 428/447

[56] References Cited

U.S. PATENT DOCUMENTS 4,725,501 2/1988 Rukavina et al. .............. 106/287.19
4,749,741 6/1988 Saito et al. ..................... 106/287.19
4,808,483 2/1989 Nakasuji et al. ..................... 428/447

*Primary Examiner*—Theodore Morris
*Attorney, Agent, or Firm*—Foley & Lardner, Schwartz, Jeffery, Schwaab, Mack, Blumenthal & Evans

[57] ABSTRACT

A primer composition, comprising:
(A) an organosilicon compound having in its molecule i) at least one hydrogen atom bonded to a silicon atom and ii) at least one group selected from silicon-bonded alkoxy groups and silicon-bonded and epoxy group-containing organic groups; and
(B) an organic titanium compound. This composition can achieve a durable adhesion even under severe conditions as in high-temperature air, high-temperature water vapor, and high-temperature oil.

8 Claims, No Drawings

PRIMER COMPOSITION

BACKGROUND OF THE INVENTION

1. Field of the Invention

This invention relates to a primer composition, and more particularly a primer composition effectively used in adhesion of silicone rubber.

2. Description of the Prior Art

In recent years, with expansion of purposes for which silicone rubbers are used, it has been required to adhere silicone rubber to various materials as exemplified by metals and synthetic resins, and various primer compositions used in adhesion of silicone rubbers have hitherto known in the art. For example, known as a primer composition for use in a silicone rubber curable by addition reaction is a composition comprising a mixture of an organosilicon compound having an alkoxy group with an organosilicon compound having an SiH group (Japanese Patent Publication (KOKOKU) Nos. 2107/1986, 4865/1986 and 4866/1986).

Meantime, because of excellent thermal resistance, silicone rubbers are often used in a severe atmosphere as in high-temperature air, high-temperature water vapor, or high-temperature oil. In the instance where the silicone rubber adhered to a substrate through the above primer composition is used in such a severe atmosphere, the silicone rubber may be peeled from the substrate because of a lowering of the adhesion attributable to the primer at the adhesion interface between it and the substrate, before the silicone rubber itself deteriorates. In particular, when immersed in a high-temperature silicone oil, because of the swell of silicone rubber, a stress is applied to the interface between the silicone rubber and substrate to produce a strain, and this strain causes the peeling, or the adhesion may be abruptly lowered in instances in which the primer composition contains a component soluble in the silicone oil.

SUMMARY OF THE INVENTION

Accordingly, an object of this invention is to provide a primer composition that can be effective for adhering silicone rubber to all sorts of materials, and can retain a sufficient adhesion even under severe conditions.

To solve the above problems, this invention provides a primer composition, comprising:

(A) an organosilicon compound having in its molecule (i) at least one hydrogen atom bonded to a silicon atom and (ii) at least one group selected from the group consisting of silicon-bonded alkoxy groups and silicon-bonded and epoxy group-containing organic groups; and (B) an organic titanium compound.

The primer composition of this invention is effective for adhering silicone rubbers to all sorts of materials, and yet can retain a durable and sufficient adhesion even under severe conditions as in high-temperature air, high-temperature water vapor, or high-temperature oil.

DETAILED DESCRIPTION OF PREFERRED EMBODIMENTS OF THE INVENTION

The organosilicon compound, the component (A) of this invention, is a compound having in its molecule (i) a silicon-bonded hydrogen atom (SiH group), which reacts with silicone rubber, and (ii) an alkoxy group- and/or epoxy group-containing organic group(s), which participate(s) in the adhesion to a substrate. This compound is principally linear, branched, or cyclic, and may also contain a network structure or three-dimensional structure.

The hydrogen atom bonded to a silicon atom, contained in the above component (A), may be a hydrogen atom bonded to the silicon atom at an end of a molecular chain or at an intermediate point of the molecular chain, and at least one silicon-bonded hydrogen atom is contained in the molecule.

The alkoxy group contained in the above component (A) includes, for example, a methoxy group, an ethoxy group, a methoxymethyleneoxy group, ethoxymethyleneoxy group, methoxyethyleneoxy group, ethoxyethyleneoxy group, and glycidyloxy group, among which preferred ones include a methoxy group, and an ethoxy group. There are no particular limitations also on the epoxy-containing organic group, which includes, for example,

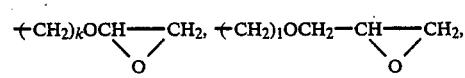

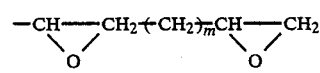

and

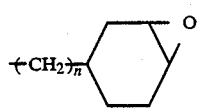

in the above formulas, k, l, m and n are each an integer of 1 to 6, among which preferred ones include

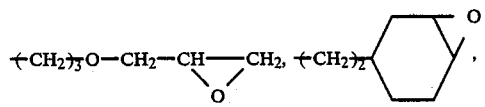

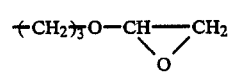

and

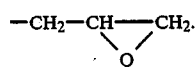

These alkoxy group- or epoxy group-containing organic groups may be contained in the molecule of the component (A) organosilicon compound of this invention singly or in combination of two or more kinds thereof. Further, two or more numbers of groups of the same kind may also be contained therein. Both the alkoxy group and epoxy group may be contained in the molecule. At least one group of this alkoxy group- or epoxy group-containing organic group is contained in the component (A).

Examples of this component (A) organosilicon compound include the following:

$HSi(OCH_3)_3$, $HSi(OC_2H_5)_3$, $H(CH_3)Si(OCH_3)_2$,

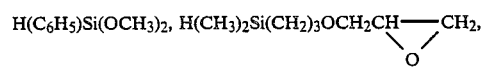
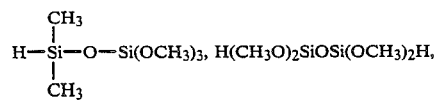
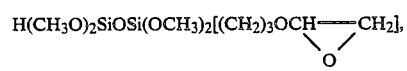
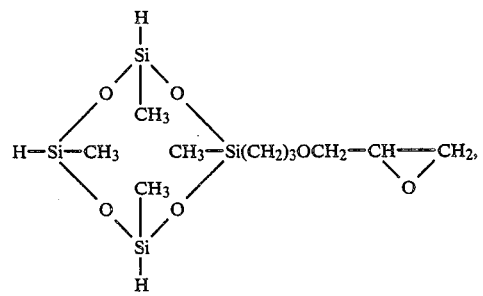
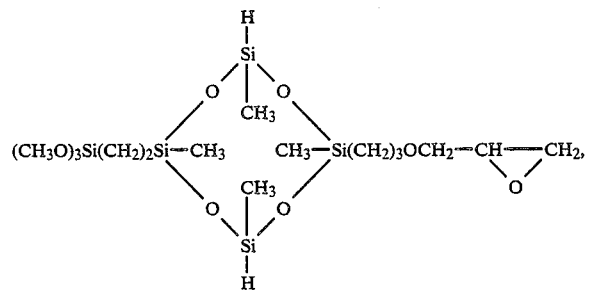
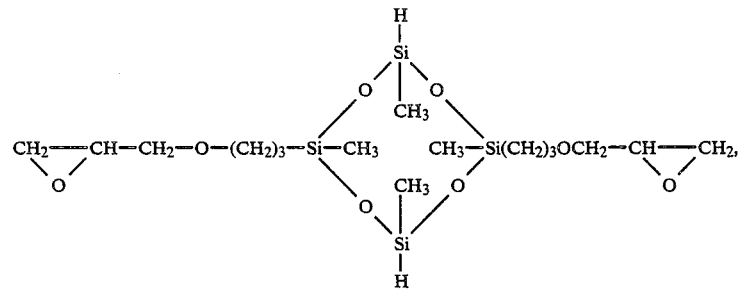
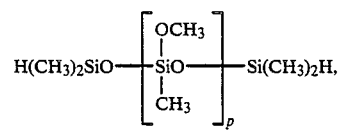
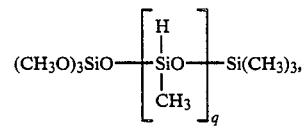
and
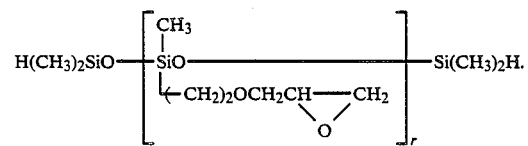

in the above formulas, p, q and r are each positive integer.

Of these compounds, preferred ones include the following:

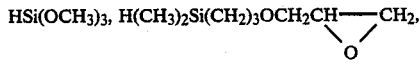

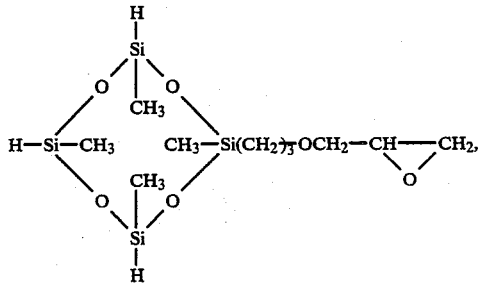

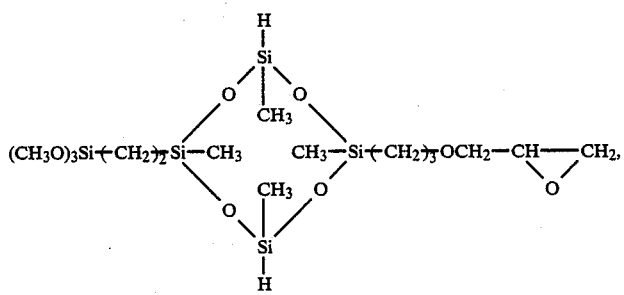

and

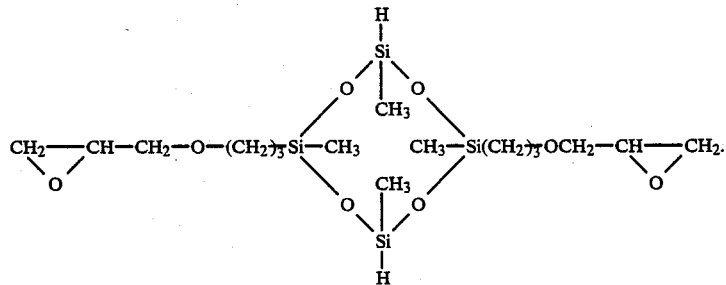

The organic titanium compound, the component (B) of this invention, may include, for example, a partially alkoxylated partial chelate compound of titanium, a chelate compound of titanium, a silicate chelate of titanium, or a partical hydrolyzation-condensation product of any of these. These make the primer composition of this invention curable, confer air-drying characteristics on the composition, and further markedly improve the adhesion of silicone rubbers to substrates and, especially, the heat resistance of the adhesion. Examples thereof include tetraisopropyl titanate, tetra-n-butyl titanate, butyl titanate dimer, tetra(2-ethylhexyl) titanate, diethoxytitanium acetylacetonate, titanium diacetylacetonate, titanium lactate, titanium lactate ethyl ester, titanium triethanolaminate, $(C_4H_9O)_2Ti(OC_8H_{16}OH)_2$, or a partial hydrolyzation condensation product of any of these. These may be used alone or in combination of two or more.

Of the above organic titanium compounds, preferred ones include tetraisopropyl titanate, tetra n-butyl titanate, and $(C_4H_9O)_2Ti(OC_8H_{16}OH)_2$.

In the primer composition of this invention, there are no particular limitations on the mixing proportion of the component (A) and component (B), and they may usually be mixed in a proportion of preferably from 5 to 500 parts by weight of the component (B), and more preferably from 30 to 200 parts by weight, based on 100 parts by weight of the component (A). With an excessively large amount of the component (B), an resultant excessively strong hydrolyzability lowers the strength of the resulting primer film. With an excessively small of the component (B), sufficient co-hydrolysis reaction with the component (A) does not proceed, resulting in difficulty in the formation of a film.

The composition of this invention may optionally contain one or more organosilicon compounds other than the component (A), as required. Such organosilicon compounds include, for example, organosilanes such as organohydrogenosilanes, vinylalkoxysilanes and mercaptosilanes, and organopolysiloxanes such as organohydrogenopolysiloxanes and vinyl group-containing organopolysiloxanes.

The primer composition of this invention can be obtained by uniformly blending the above component (A) and component (B). For example, to make it easy to coat the primer composition, the composition may also be optionally diluted with an organic solvent. This organic solvent includes, for example, toluene, xylene, benzene, heptane, hexane, trichloroethylene, perchloroethylene, ethyl acetate, ethanol, isopropanol, butanol, acetone, methyl ethyl ketone, tetrahydrofuran, ligroin, and rubber gasoline, which may be appropriately selected in consideration of the volatility in carrying out the coating. It is also possible to add known additives such as silica fillers, and silicone resins comprising $RSiO_{3/2}$, $SiO_{4/2}$ or the like (wherein R is an organic group) to improve the film strength obtained when the composition of this invention is cured; red oxide, cerium oxide, cerium hydroxide, fatty acid salts of cerium, fatty acid salts of iron, titanium oxide, carbon black or the like to improve thermal resistance; and all sorts of pigments to effect coloring. These additives may be added so long as the desired properties of the composition of this invention are not impaired.

In adhering silicone rubber to a substrate by using the composition of this invention, the substrate is coated with the composition of this invention, followed by air-drying, for example, for not less than 15 minutes, and more preferably from 30 to 120 minutes, and then the silicone rubber may be adhered. If necessary, the silicone rubber may be adhered after carrying out baking at 120° to 180° C. for 10 to 30 minutes so that the composition of this invention can be surely cured.

There are no particular limitations on the silicone rubber that can be adhered to various sorts of substrates through the composition of this invention. The primer composition of this invention is effectively used when silicone rubbers such as liquid addition-type silicone rubber compositions and uncured products of peroxide crosslinked silicone rubbers are adhered.

There are no particular limitations on the materials for the substrate to which the composition of this invention can be applied, and they include, for example, metals such as iron, aluminum, nickel, chromium, zinc and copper, alloys of any of these, and synthetic resins such as phenol resins and epoxy resins.

The primer composition of this invention is effective when silicone rubber is adhered to a variety of substrates, and can be used in a variety of purposes. In particular, the composition can retain its adhesive force for a long period of time even in instances where products are immersed in a high-temperature oil, so that it can be very effectively used, for example, in adhering silicone rubber to a roll mandrel of a copying machine, adhering a silicone rubber FIGP material to the housing of an oil seal, etc.

In the primer composition of this invention, the component (A) organosilicon compound concurrently has in its molecule an alkoxy group- and/or epoxy group-containing organic group(s), which react with the substrate, and a SiH group, which reacts with silicone rubber, and hence it is presumed that a firm adhesion and the stability of adhesion can be obtained. In this invention, it is also presumed that the component (B) not only makes the composition curable and thereby imparts air-drying characteristics, but also remarkably improves the adhesion of silicone rubber, in particular, the thermal resistance of adhesion.

EXAMPLES

This invention will be described below in detail by way of Examples and Comparative Examples. In the following, "parts" indicates "parts by weight".

EXAMPLE 1

A primer composition was obtained by uniformly blending 100 parts of a cyclic organosilicon compound represented by the formula:

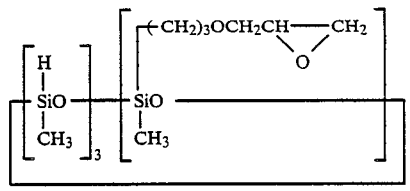

100 parts of tetra-n-butyl titanate, 500 parts of ligroin and 500 parts of toluene.

The resulting primer composition was coated on a test panel measuring 2.5 cm × 10.0 cm, made of aluminum, followed by air-drying at room temperature for 30 minutes. Thereafter an addition-type silicone rubber (KE-1330A/B, a product of Shin-Etsu Chemical Co., Ltd.) was coated thereon with a thickness of 2 mm, and cured by heating at 120° C. for 10 minutes.

It was tried to peel the silicone rubber layer cured on the test panel with a knife, but the silicone rubber could not be peeled because of firm adhesion to the metal surface. Next, the test panel was immersed in dimethylsilicone oil (KF96, a product of Shin-Etsu Chemical Co., Ltd.) having a viscosity of 100 cSt at 25° C., and kept immersed at 200° C. for 10 days. Thereafter the adhesion was examined by using the knife in the same manner as above, so that it was found that the silicone rubber layer, though swelled by the silicone oil, was firmly adhered to the aluminum surface through the layer of the primer composition, and it was impossible to peel the silicone rubber layer.

COMPARATIVE EXAMPLE 1

A primer composition was prepared by uniformly blending 51 parts of an SiH group-containing methylpolysiloxane represented by the formula:

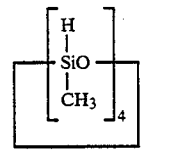

67 parts of an alkoxy group-containing silane represented by the formula:

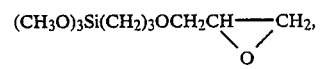

100 parts of tetra-n-butyl titanate, 500 parts of ligroin and 500 parts of toluene.

In the same manner as in Example 1, except that the primer composition thus obtained was used, a cured product of the addition-type silicone composition was formed on a panel, and then the adhesion immediately after adhering, and also the adhesion after long-term immersion in the high-temperature silicone oil. As a result, the silicone rubber layer was firmly adhered immediately after cure of silicone rubber and it was impossible to peel it. However, after immersion in the silicone oil at 200° C. for 10 hours, the primer composition layer was found to have been peeled from the aluminum surface or the silicone rubber layer.

EXAMPLE 2

A primer composition was prepared by uniformly blending 100 parts of HSi(OCH$_3$)$_3$, 50 parts of tetraisopropyl titanate and 850 parts of n-hexane.

The resulting primer composition was coated on a test panel made of aluminum, followed by air-drying at room temperature for 30 minutes. Thereafter an addition-type high-strength oil-resistant silicone rubber composition (KE-1981A/B, a product of Shin-Etsu Chemical Co., Ltd.) was coated thereon with a thickness of 2 mm, and cured by heating at 170° C. for 10 minutes.

It was tried to peel the silicone rubber layer cured on the test panel with a knife, but the silicone rubber layer could not be peeled because of firm adhesion to the metal surface. Next, the test panel was immersed in JIS #1 oil heated to 150° C., for 500 hours. Thereafter, adhesion was examined using the knife in the same manner as above. As a result, the cured silicone rubber layer was firmly adhered to the substrate aluminum through the primer composition layer, and it was impossible to peel the silicone rubber layer.

We claim:
1. A primer composition, comprising:
   (A) an organosilicon compound having in its molecule
      (i) at least one hydrogen atom bonded to a silicon atom, and
      (ii) at least one silicon-bonded and epoxy-group-containing organic group; and
   (B) an organic titanium compound.
2. The composition of claim 1, wherein the component (B) is contained in an amount of from 5 to 500 parts by weight per 100 parts by weight of the component (A).
3. The composition of claim 1, wherein said epoxy group-containing organic group possessed by the component (A) organosilicon compound is selected from the group consisting of

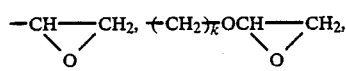

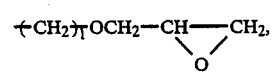

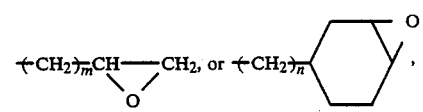

in the above formulas, k, l, m, and n are each an integer of 1 to 6.
4. The composition of claim 3, wherein said epoxy group-containing organic group is selected from the group consisting of

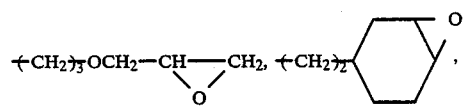

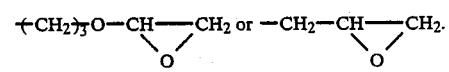

5. The composition of claim 1, wherein the component (A) organosilicon compound is selected from the group consisting of

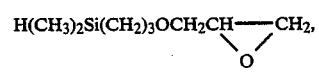

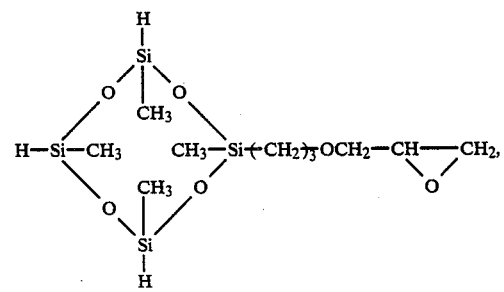

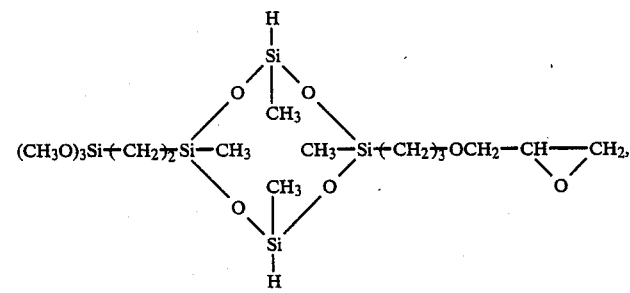

and

-continued

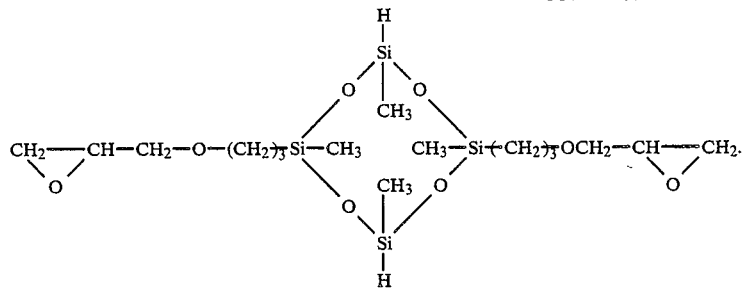

6. The composition of claim 1, wherein the component (B) organic titanium compound is selected from the group consisting of tetraisopropyl titanate, tetra-n-butyl titanate, butyl titanate dimer, tetra(2-ethylhexyl) titanate, diethoxytitanium acetylacetonate, titanium diacetylacetonate, titanium lactate, titanium lactate ethyl ester, titanium triethanolaminate, $(C_4H_9O)_2Ti(OC_8H_{16}OH)_2$.

7. The composition of claim 6, said component (B) is selected from the group consisting of tetraisopropyl titanate, tetra-n-butyl titanate and $(C_4H_9O)_2Ti(OC_8H_{16}OH)_2$.

8. The composition of claim 6, wherein the component (B) is contained in an amount of from 30 to 200 parts by weight per 100 parts by weight of the component (A).

* * * * *